US012585120B2

(12) United States Patent
Huo et al.

(10) Patent No.: US 12,585,120 B2
(45) Date of Patent: Mar. 24, 2026

(54) ELECTRONIC DEVICES WITH ILLUMINATION SYSTEMS

(71) Applicant: Apple Inc., Cupertino, CA (US)

(72) Inventors: Edward S Huo, Sunnyvale, CA (US); Devinne Cullinane, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 352 days.

(21) Appl. No.: 18/461,135

(22) Filed: Sep. 5, 2023

(65) Prior Publication Data

US 2025/0076650 A1     Mar. 6, 2025

(51) Int. Cl.
  *G02B 27/01*       (2006.01)
  *G02B 27/00*       (2006.01)
  *G06V 10/141*      (2022.01)
  *G06V 40/20*       (2022.01)

(52) U.S. Cl.
  CPC ..... *G02B 27/0172* (2013.01); *G02B 27/0093* (2013.01); *G06V 10/141* (2022.01); *G06V 40/28* (2022.01); *G02B 2027/0138* (2013.01)

(58) Field of Classification Search
  CPC ............ G02B 27/0172; G02B 27/0093; G02B 2027/0138; G02B 2027/0187; G02B 26/08; G02B 26/0875; G02B 2027/0192; G06V 10/141; G06V 40/28; H04M 1/02; H04M 1/22; F21V 5/04; F21V 14/02; F21V 14/06; G03B 15/02; F21Y 2115/10; F21Y 2115/30
  See application file for complete search history.

(56) References Cited

U.S. PATENT DOCUMENTS

| | | | | |
|---|---|---|---|---|
| 5,835,797 | A | * 11/1998 | Odaka | ................ G02B 27/0093 |
| | | | | 396/51 |
| 10,114,465 | B2 | 10/2018 | Wan et al. | |
| 11,294,472 | B2 | 4/2022 | Tang et al. | |
| 11,520,409 | B2 | 12/2022 | Kwon et al. | |
| 2010/0309288 | A1 * | 12/2010 | Stettner | ................... H04N 23/54 |
| | | | | 348/E13.001 |
| 2014/0282274 | A1 | 9/2014 | Everitt et al. | |
| 2016/0378176 | A1 | 12/2016 | Shiu et al. | |
| 2021/0228151 | A1 * | 7/2021 | Wang | ...................... A61B 5/489 |
| 2021/0232289 | A1 * | 7/2021 | Aslandere | ................ G06N 3/08 |
| 2022/0397956 | A1 * | 12/2022 | Lundell | .............. G02B 27/0093 |
| 2023/0177885 | A1 | 6/2023 | Kramer et al. | |
| 2023/0281835 | A1 * | 9/2023 | Gruhlke | ............. G02B 27/0093 |
| | | | | 382/100 |

* cited by examiner

*Primary Examiner* — Mariam Qureshi
(74) *Attorney, Agent, or Firm* — Treyz Law Group, P.C.; Kendall P. Woodruff

(57)         ABSTRACT

A head-mounted device may include displays for presenting images to a user. The head-mounted device may have a hand tracker for gathering hand tracking input from a user. The hand tracker may include a steerable illumination system such as a steerable infrared illuminator. Infrared light may be steered by selectively activating light-emitting diodes in an array and/or using positioners to move an infrared light source and/or lens in the illuminator. An infrared image sensor may gather images of the hands. Based on the monitored movement of a hand, the steerable illumination system may steer the infrared light to ensure that the hand remains illuminated even during hand movements.

20 Claims, 6 Drawing Sheets

ELECTRONIC DEVICES WITH ILLUMINATION SYSTEMS

FIELD

This relates generally to illumination systems, and, more particularly, to electronic devices with illumination systems.

BACKGROUND

Electronic devices have components such as image sensors. It can be challenging to operate image sensors in certain ambient lighting conditions such as low ambient lighting conditions.

SUMMARY

Electronic devices may be provided with sensors and adjustable illumination systems that provide illumination for the sensors.

A head-mounted device may include displays for presenting images to a user. The head-mounted device may have a hand tracker for gathering hand input from a user. The hand tracker may include a steerable illumination system such as a steerable infrared illuminator. Using the steerable infrared illuminator, infrared illumination may be provided in a relatively narrow beam while illuminating a user's hand. This may help the head-mounted device conserve power while providing satisfactorily illumination.

Infrared light may be steered by selectively activating light-emitting diodes in an array of diodes in an infrared light source and/or by using positioners to move the infrared light source and/or lens in the illuminator. During operation of a device, an infrared image sensor may gather images of a user's hand. Based on the monitored movement of the hand, the steerable illumination system may steer the infrared light so that the infrared light tracks the moving hand. This helps to ensure that the moving hand will remain illuminated during hand motions and will not move out of the area illuminated by the illuminator.

If desired, adjustable illumination systems may be used in laptop computers, tablet computers, cellular telephones, wristwatches, and other devices.

DETAILED DESCRIPTION

Electronic devices may have sensors for gathering user input and making other measurements. Some electronic devices may use image sensors. As an example, an electronic device with video conferencing capabilities may use an image sensor to capture images of a user during a video call. As another example, a gaze tracking system in an electronic device may use an image sensor to capture images of infrared light glints on a user's eyes and thereby track the direction of the user's gaze. Some electronic devices may have hand tracking systems. In hand tracking systems, image sensors may be used to capture images of a user's hands. By processing these images, the movement of the user's hands and gestures made by the user's hands and/or fingers can be identified and used as a form of user input.

In some ambient lighting conditions, there may be sufficient ambient light available to operate image sensors. For example, in bright ambient lighting conditions, images of a user's hands may be captured satisfactorily. In dim ambient lighting conditions, however, it may be desirable for an electronic device to emit supplemental illumination to ensure that the user's hands remain visible to the image sensors of the device. Supplemental illumination may be provided at visible and/or infrared wavelengths. As an example, when tracking a user's hands in dim lighting, supplemental infrared illumination may be emitted. The presence of the supplemental infrared illumination may help infrared image sensors capture satisfactory hand images. At the same time, the use of infrared illumination, which is invisible to the naked eye, may help avoid disturbing people who are nearby.

To help ensure that excessive power is not consumed during the production of supplemental illumination, electronic devices may be provided with adjustable illumination systems. The angular spread and intensity of the emitted illumination may be adjusted in real time to focus on target objects of interest. For example, when tracking a user's hand, an adjustable illumination system may produce a beam of infrared light that is focused on the user's hand. As the user's hand is moved, the infrared light beam may be steered to follow the hand. With this approach, it is not necessary to illuminate extraneous background objects in a scene. The use of adjustable illumination systems may therefore help conserve power.

Figure 1:
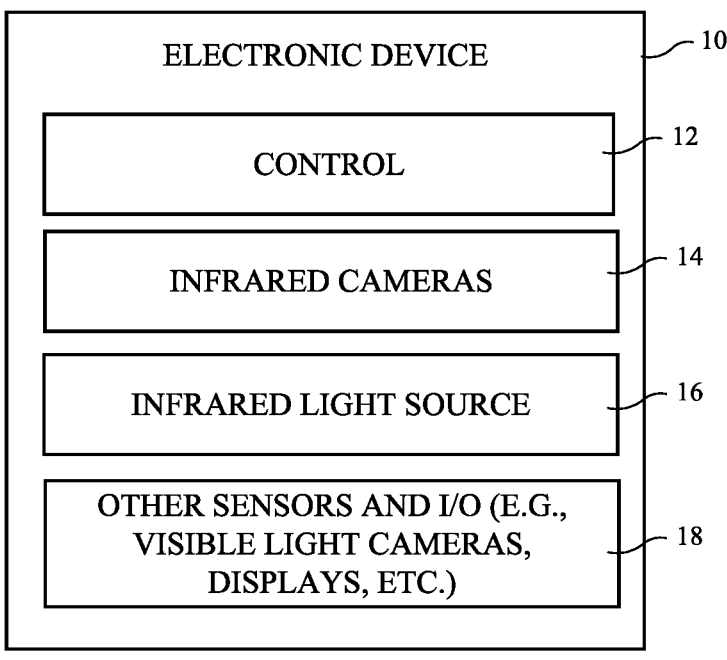
FIG. 1 is a schematic diagram of an illustrative electronic device in accordance with an embodiment.

FIG. 1 is a schematic diagram of an illustrative electronic device. Device 10 of FIG. 1 may be a head-mounted device (e.g., goggles, glasses, a helmet, and/or other head-mounted device), a laptop computer, a portable electronic device such as a cellular telephone, tablet computer, or wristwatch device, or other electronic equipment.

As shown in FIG. 1, device 10 may have a controller such as control 12. Control 12 may have control circuitry such as microprocessors, microcontrollers, digital signal processors, application-specific integrated circuits, storage such as volatile and non-volatile memory, and other storage and processing circuitry. Control 12 may be used in processing data gathered by the components in device 10 and may be used in controlling device operations.

Device 10 may have one or more infrared image sensors 14 (sometimes referred to as infrared cameras). For example, device 10 may use one or more image sensors 14 for gaze tracking, hand tracking, facial recognition, face and/or body tracking, and/or other operations involving the capturing and processing of infrared images. Adjustable infrared illumination (e.g., supplemental infrared illumination) may be provided by one or more infrared light sources such as infrared light source 16. Source 16 may include one or more light-emitting elements (e.g., light-emitting diodes, lasers, etc.).

Device 10 may also include additional components 18 (e.g., additional sensors such as visible light image sensors (sometimes referred to as visible light cameras), displays and other output devices that emit light (e.g. head-mounted device displays that present images to eye boxes for viewing by a user), touch sensors, force sensors, proximity sensors, temperature sensors, accelerometers, microphones, and other sensors, haptic output devices, speakers, actuators (sometimes referred to as positioners or motors), a battery for supplying device 10 with power, and other components.

Components for device 10 such as image sensors 14, light sources 16, and other components 18 may be mounted at any suitable location in device 10. Illustrative mounting arrangements for device components are shown in FIGS. 2, 3, and 4.

Figure 2:
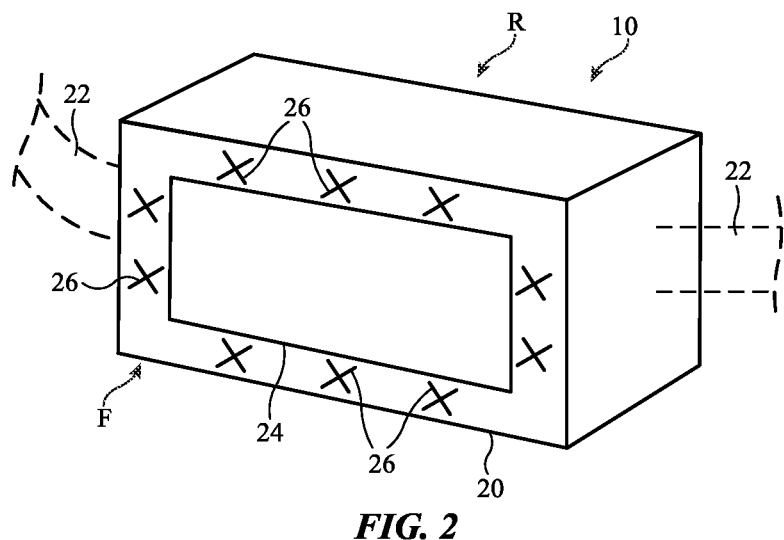
FIG. 2 is a perspective view of an illustrative head-mounted device in accordance with an embodiment.

In the example of FIG. 2, device 10 is a head-mounted device having a head-mounted housing 20 and head straps 22. Housing 20 may have a front F and a rear R. The components of device 10 of FIG. 1 may be mounted in head-mounted housing 20. During operation, rear R of housing 20 may rest against a user's face. Optical assemblies containing displays and lenses may present images in a pair of eye boxes at rear R for viewing by a user. An outwardly facing display may optionally be mounted in region 24 at front F. Components for device 10 such as image sensors 14, light sources 16, and other components 18 may be mounted on outwardly facing surfaces of housing 20 (e.g., at one or more illustrative locations 26 at front F and/or in other portions of housing 20).

Figure 3:
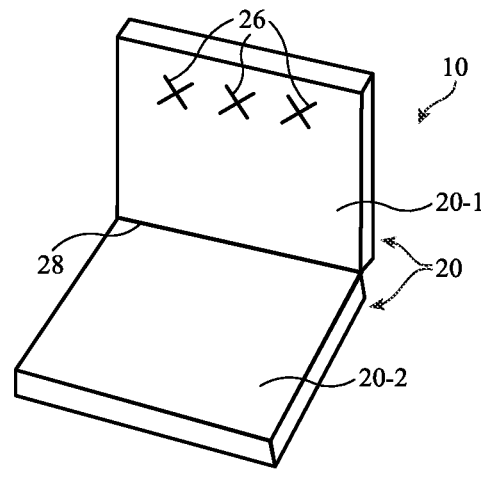
FIG. 3 is a perspective view of an illustrative laptop computer in accordance with an embodiment.

In the example of FIG. 3, device 10 is a laptop computer having housing portions 20-1 and 20-2 that rotate with respect to each other about hinge 28. A display may be mounted on portion 20-1 and a keyboard may be mounted on portion 20-2. Components for the laptop computer such as image sensors 14, light sources 16, and other components 18 may be mounted on one or more outwardly facing surfaces of housing 20 (e.g., at one or more illustrative locations 26 on housing 20-1 or elsewhere in housing 20).

Figure 4:
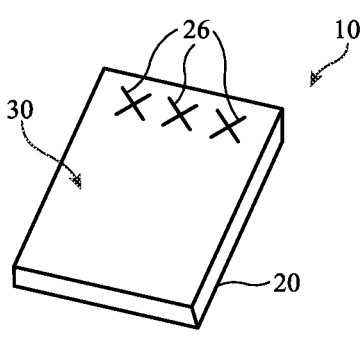
FIG. 4 is a perspective view of an illustrative portable electronic device such as a cellular telephone, tablet computer, or wristwatch device in accordance with an embodiment.

FIG. 4 is a perspective view of device 10 in an illustrative configuration in which device 10 is a portable electronic device such as a tablet computer, cellular telephone, or wristwatch device. As shown in FIG. 4, device 10 may have a housing such as housing 20. A display such as a touch-screen display may be mounted on face 30 of device 10. Components for device 10 such as image sensors 14, light sources 16, and other components 18 may be mounted on one or more outwardly facing surfaces of housing 20 (e.g., at one or more illustrative locations 26 on face 30).

Figure 5:
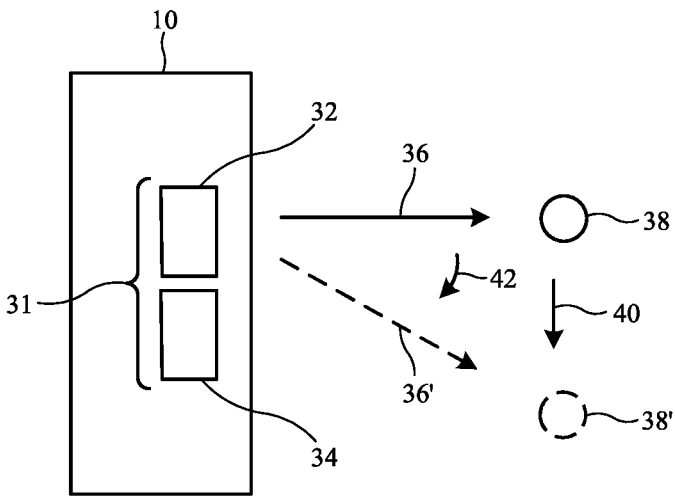
FIG. 5 is a diagram of an illustrative electronic device having a hand tracker or other system containing a sensor and an adjustable illumination system that provides illumination for the sensor in accordance with an embodiment.

FIG. 5 is a diagram of an illustrative electronic device that is providing illumination to illuminate a target. As shown in FIG. 5, electronic device 10 may include adjustable illumination system 32 and sensor 34. Adjustable illumination system 32, which may sometimes be referred to as a steerable light source, steerable lighting system, adjustable lighting system, adjustable illuminator, or steerable illuminator, may have one or more light-emitting components such as infrared light source 16 of FIG. 1 that emit light 36 (sometimes referred to as illumination). Light 36 may illuminate a target object such as target 38. Light 36 may be visible and/or infrared light. In an illustrative configuration, which is sometimes described herein as an example, light 36 is infrared light (infrared illumination) and system 32 may be referred to as an adjustable infrared illuminator or steerable infrared illuminator.

Target 38 may be an animate or inanimate object. As an example, target 38 may include one or more body parts of a user (e.g., a user's hand, fingers, eye, head, full body, etc.) or inanimate objects (e.g., a wand). Illustrative configurations in which target 38 is a hand of a user and light 36 is infrared hand tracker illumination may sometimes be described as an example.

When system 32 and sensor 34 are used together as combined system 31 in a head-mounted device (or other device) for hand tracking, this combined system 31 may sometimes be referred to as a hand tracker or hand tracking system. During hand tracking operations with the hand tracker, hand motions, finger gestures and other hand input may be used as a form of user input for controlling the operation of device 10. For example, hand gestures may be used to move virtual objects being presented to the user with the display resources of device 10, may be used to make menu selections in displayed content, etc. Virtual objects (which may sometimes be referred to as computer-generated content) may be presented in isolation or may be merged with real-world content (e.g., real-time real-world content captured using forward-facing cameras in housing 20). If desired, virtual hands may be presented to a user in positions that correspond to the real-world positions of the user's hands as sensed with the hand tracker.

During operation, while target 38 is illuminated by light 36 and by any ambient light that may or may not be present, a sensor such as sensor 34 may be used to gather data on target 38. As an example, sensor 34 may include one or more infrared image sensors such as infrared image sensors (cameras) 14 of FIG. 1 and/or visible light image sensors (see, e.g., components 18). In an arrangement in which sensor 34 is an infrared image sensor in a hand tracker, sensor 34 may gather infrared hand images for hand tracking (e.g., infrared hand images illuminated by infrared light 36, sometimes referred to as hand tracking image or infrared hand tracking images). The fields of view of the image sensors may at least partly overlap so that three-dimensional images may be captured. This allows device 10 to track the position of target 38 in three dimensions. For example, sensor 34 may track movement of a user's hand as the hand is moved up/down, left/right, and/or forward/backward with respect to sensor 34. In a head-mounted device, for example, one or both of the user's hands may be within the field-of-view of sensor 34 and may be illuminated by light 36 (e.g., light 36 may be produced as supplemental illumination whenever ambient lighting conditions are dim and/or may be produced during other ambient lighting conditions).

Using sensor 34, images (e.g., three-dimensional images from stereoscopic infrared image sensors) may be captured that reveal the location (e.g., position in three dimensions) of target 38. By comparing the position of target 38 between successive image frames or other suitable time period, the speed and direction of motion of target 38 may be determined by sensor 34. Based on this monitored hand motion information, sensor 34 can predict the future position of target 38. This allows a beam of light 36 from system 32 to

5 | 6 be steered or otherwise adjusted to ensure that target 38 can be tracked even as target 38 is moved.

In general, adjustments to the light 36 that is produced by system 32 may include adjustments to the direction in which light 36 is emitted and adjustments to the angular coverage of light 36 (e.g., light beam direction and/or light beam size). Light 36 may also be split into multiple beams, if desired. In some situations, adjustments may be made to the intensity of light 36 (e.g., output light intensity may be increased whenever appropriate to ensure that a desired minimum signal-to-noise ratio is obtained when capturing images with sensor 34 and may be otherwise decreased to conserve power). Conditions that may impact the signal-to-noise ratio include ambient light level, target distance, and target reflectivity (as examples).

Consider, as an example, a scenario in which target 38 is being moved in direction 40 to position 38'. Using sensor 34, the present location of target 38 can be captured and motion information indicating the speed and direction of movement of object 38 can be determined. Sensor 34 can then predict the location (in three dimensions) of position 38'. Using this information from sensor 34, system 32 can steer light 36 towards position 38'. As shown in FIG. 5, for example, the direction in which light 36 is emitted can be changed to new direction 36' by making angular adjustment 42 to the direction of the emitted illumination from system 32.

Figure 6:
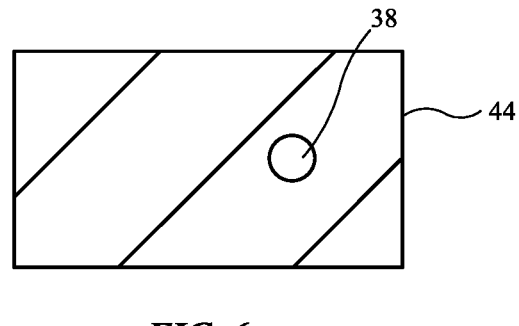
FIGS. 6, 7, and 8 are diagrams showing illustrative illumination coverage for an adjustable illumination system in different operating scenarios in accordance with an embodiment.
Figure 7:
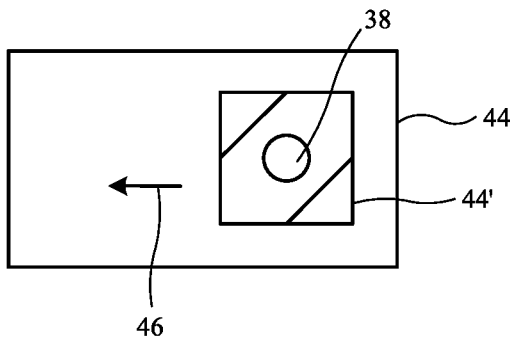
Figure 8:
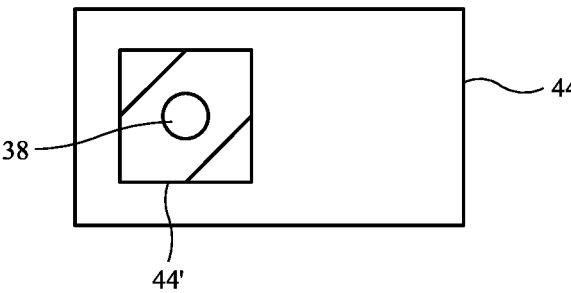

Initially, when hand tracking (or other target tracking) operations are commenced, device 10 may not know the location of target 38. Hand tracking may also sometimes be interrupted momentarily (e.g., when the user's hands are blocked by an obstruction). As shown in FIG. 6, in situations such as these, system 32 may be adjusted to provide flood illumination (e.g., light 36 may completely cover area 44, which may be, for example, the entire field of view of sensor 34). After the location of target 38 is reacquired by sensor 34 while light 36 is emitted over all of area 44 in this way, system 32 may be adjusted to narrow the angular spread of light 36. System 32 may, as an example, be used to produce a beam of light 36 that covers reduced-size area 44' of FIG. 7. Area 44' may be adjusted to overlap target 38 (with sufficient buffer around the edge of target 38 to account for processing latency), so system 32 can continue to track target 38 despite covering a smaller area than area 44. The size of area 44' may be 70% or less, 30% or less, or 15% or less of the total size of area 44, thereby helping to conserve power.

In the event that target 38 moves (e.g., in direction 46 of FIG. 7), sensor 34 can detect this movement and, based on the monitored target motion (e.g., monitored hand motion), system 32 may be adjusted so that area 44' is moved to illuminate target 38 in its new location.

Figure 9:
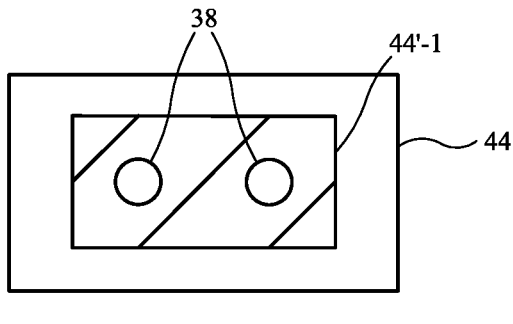
FIGS. 9 and 10 are diagrams showing illustrative illumination coverage for an adjustable illumination system in scenarios in which multiple target objects are being illuminated in accordance with an embodiment.
Figure 10:
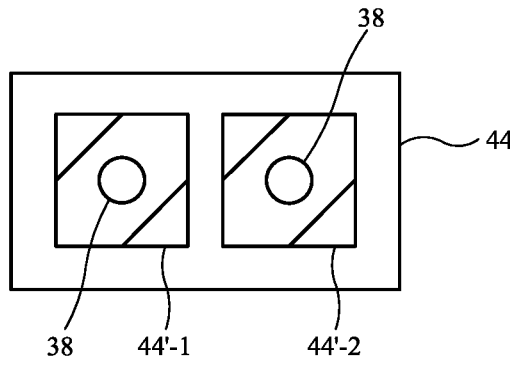

If desired, area 44' may be divided into multiple subareas. As shown in FIG. 9, for example, area 44' may cover two targets 38 when targets 38 are located adjacent to each other. In the event that targets 38 are separated from each other (e.g., if the user's hands are moved apart), system 32 can be adjusted to produce two separate beams of light 36 for two respective separate areas. As shown in FIG. 10, for example, first area 44'-1 may be provided with a first beam of light 36 to illuminate a first of targets 38 and second area 44'-2 may be provided with a second beam of light 36 to illuminate a second of targets 38. System 32 may, if desired, use multiple light-emitting devices such as multiple infrared light-emitting diodes and multiple corresponding light steering systems to create multiple discrete (unconnected and nonoverlapping) illumination areas that can independently track each of a user's two hands.

Figure 11:
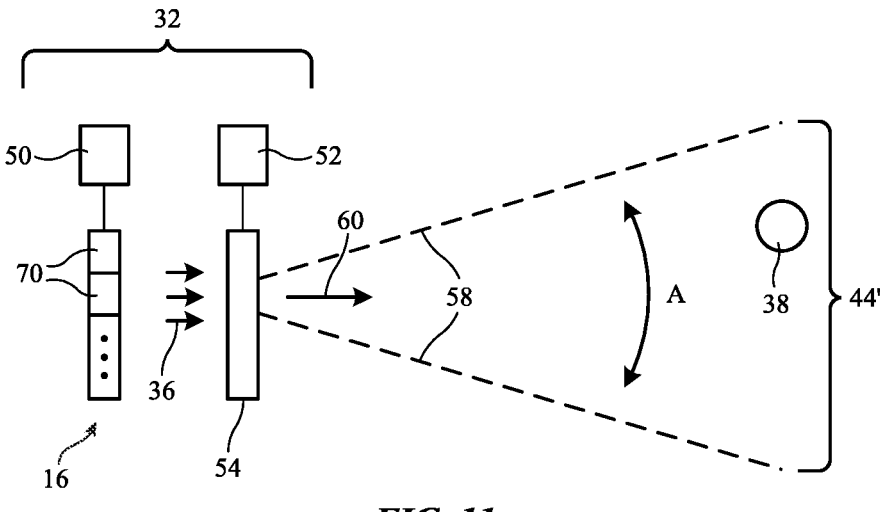
FIG. 11 is a diagram of an illustrative adjustable illumination system in accordance with an embodiment.

FIG. 11 is a diagram of an illustrative adjustable illumination system for illuminating a target 38 with light 36. As shown in FIG. 11, system 32 may include a light source 16 having one or more individual light-emitting devices 70. Devices 70 may be individually adjustable light-emitting diodes or lasers (as example). During operation, light source 16 is turned on to produce light 36. Light 36 may be emitted from system 32 through lens 54. Lens 54 may include one or more lens elements that collimate and/or otherwise shape the emitted light 36 from source 16 and thereby produce one or more desired beams of light. In the example of FIG. 11, light is being emitted in direction 60 and, as illustrated by dashed lines 58 is characterized by an angular spread A. In proximity of target 38 this creates an illumination area 44' that overlaps target 38 and thereby illuminates target 38. This ensures that target 38 will be visible to sensor 34 (FIG. 5), even in low ambient lighting conditions.

To steer and shape the beam of light 36 emitted from system 32, system 32 may adjust which of devices 70 are active and may use one or more positioners such as positioners 50 and 52 to adjust the positions of light source 16 and lens 54. If desired, a given system 32 may have multiple light sources 16, multiple positioners 50, multiple corresponding lenses 54, and multiple positioners 52. Configurations in which system 32 has a single light source 16, a single positioner 50, a single lens 54 (which may be a single-element or multi-element lens), and a single positioner 52 may be described as an example.

Positioners 50 and 52 may be electromechanical actuators based on piezoelectric elements, motors, solenoids, and/or other adjustable actuators. Positioners 50 and 52 may, in general, make position adjustments over six degrees of freedom (e.g., each positioner may be capable of translating its corresponding component along one or more of three linear dimensions X, Y, and Z and may be capable of tilting its corresponding component about each of these three linear dimensions). Arrangements in which positioners 50 and 52 are only capable of making a subset of these position adjustments (e.g., a subset of the lateral motions along X, Y, and Z and a subset of the angular rotations about X, Y, and Z) may also be used.

Figure 12:
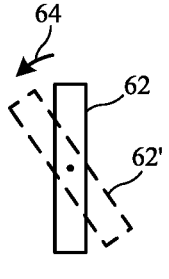
FIGS. 12, 13, 14, and 15 are diagrams showing how the components of the illustrative adjustable illumination system of FIG. 11 may be adjusted during operation in accordance with embodiments.
Figure 13:
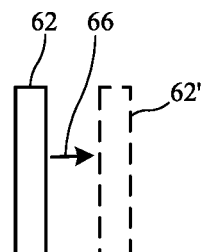
Figure 14:
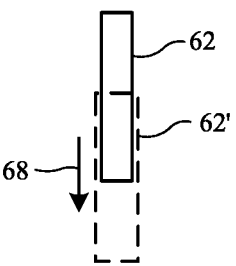

Light source 16 and lens 54 may be mounted on gimbal mounts or other mounts that allow them to rotate and/or translate under control of positioners 50 and 52, respectively. FIG. 12 shows how component 62 (which may be light source 16 and/or lens 54) may be rotated (tilted) in direction 64 about an axis to new (tilted) position 62' by positioner 50 or positioner 52. This type of operation may be used on source 16 and/or lens 54 to change (steer) the direction in which light 36 is emitted from system 32. FIG. 13 shows how component 62 may be translated in direction 66 to new position 62' using positioner 50 or positioner 52. This type of translation may, as an example, be used to move source 16 and lens 54 closer to each other or farther apart from each other (e.g., to adjust the angular spread of the output light). If desired, an accelerometer or other sensor in device 10 can detect when device 10 is in free-fall (zero gravity conditions) and can therefore quickly move source 16 and lens 54 apart to avoid undesired and potentially damaging contact between source 16 and lens 54 when device 10 contacts the ground. In the FIG. 14 example, component 62 is being shifted (translated) in direction 68 by positioner 50 or 52 to new position 62'. This type of movement may steer the output beam direction.

Figure 15:
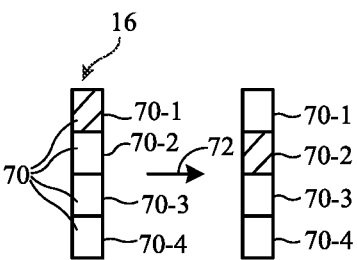

FIG. 15 shows how a subset of one or more devices (light-emitting elements) 70 may be turned on while remaining devices 70 are turned off. By selective activation of desired devices 70, the size, direction, and shape of the output beam may be adjusted. There may be N devices 70 in source 16 and devices 70 may be arranged in a one-dimensional or two-dimensional array. The value of N may be at least 1, at least 2, at least 4, at least 16, at least 25, at least 36, fewer than 100, fewer than 40, and/or other suitable value. In the example of FIG. 15, only device 70-1 is initially turned on while devices 70-2, 70-3, and 70-4 are turned off. As illustrated by arrow 72, the pattern of activated devices 70 may be adjusted when it is desired to adjust the pattern of illumination produced by system 32. In the FIG. 15 arrangement, device 70-1 is deactivated and devices 70-3 and 70-4 remain inactive while device 70-2 is turned on. Because device 70-2 is now producing output light rather than device 70-1, the position from which light is emitted from devices 70 towards lens 54 is altered and the resulting direction of output light from system 32 is therefore altered. Beam size may be altered by increasing and decreasing the number of devices 70 that are active. For example, light 36 will cover a wider area when all of devices 70 are turned on than when only a single of devices 70 is turned on. Techniques in which light beam shaping (steering) using selective activation of devices 70 in system 32 may be used in combination with use of positioner 50 and/or positioner 52 to move source 16 and/or lens 54 or may be used separately (e.g., positioners 50 and/or 52 may be omitted).

Although sometimes described in connection with producing supplemental infrared illumination for hand tracking in a head-mounted device, adjustable illumination system 32 may be used in other contexts, as described in connection with FIGS. 3 and 4. For example, in a laptop computer configuration (FIG. 3) or cellular telephone, tablet, or wristwatch configuration (FIG. 4), light 36 may be produced to help illuminate a user's face (or entire body) during a video conference. In this scenario, light 36 may include infrared and/or visible light. In any type of device 10, device 10 may use a display to present infrared images for user viewing that have been captured with one or more infrared image sensors. In these arrangements, light 36 may be used to illuminate some or all of the area covered by the infrared image sensors (e.g., device 10 may be used for infrared photography or to support operation of device 10 in a night-vision mode). In some arrangements, system 32 may provide adjustable visible illumination while sensor 34 is collecting still and/or video images (e.g., to ensure a target is visible, to achieve desired artistic effects, etc.). Steerable light beams produced by system 32 may also be used in a gaze tracking system for device 10 (e.g., a head-mounted device or other device 10). In particular, system 32 may steer a narrow beam of infrared light to various glint locations on a user's eye surface while sensor 34 detects and analyzes these glint locations to determine the direction in which the user's eyes are pointed (sometimes referred to as the user's point of gaze or gaze direction). One or more adjustable illumination systems 32 and sensors 34 may be used in each device 10.

To help protect the privacy of users, any personal user information that is gathered by device 10 may be handled using best practices. These best practices including meeting or exceeding any privacy regulations that are applicable. Opt-in and opt-out options and/or other options may be provided that allow users to control usage of their personal data.

The foregoing is merely illustrative and various modifications can be made to the described embodiments. The foregoing embodiments may be implemented individually or in any combination.

What is claimed is:

1. A head-mounted device, comprising:
a head-mounted housing;
displays in the head-mounted housing; and
a hand tracker in the head-mounted housing, wherein the hand tracker comprises:
    a steerable infrared illuminator configured to provide infrared light; and
    an infrared image sensor configured to gather infrared hand tracking images illuminated by the infrared light.

2. The head-mounted device defined in claim 1 wherein the steerable infrared illuminator comprises multiple infrared light-emitting diodes configured to be selectively activated to steer the infrared light.

3. The head-mounted device defined in claim 1 wherein the steerable infrared illuminator comprises a lens and an infrared light source configured to provide the infrared light through the lens.

4. The head-mounted device defined in claim 3 wherein the steerable infrared illuminator further comprises a positioner configured to move the lens to steer the infrared light.

5. The head-mounted device defined in claim 4 wherein the positioner is configured to tilt the lens about an axis.

6. The head-mounted device defined in claim 4 wherein the positioner is configured to translate the lens along an axis.

7. The head-mounted device defined in claim 3 wherein the steerable infrared illuminator further comprises a positioner configured to move the infrared light source to steer the infrared light.

8. The head-mounted device defined in claim 7 wherein the positioner is configured to tilt the infrared light source about an axis.

9. The head-mounted device defined in claim 7 wherein the positioner is configured to translate the infrared light source along an axis.

10. The head-mounted device defined in claim 3 wherein the steerable infrared illuminator further comprises:
    a first positioner configured to move the infrared light source; and
    a second positioner configured to move the lens.

11. The head-mounted device defined in claim 10 wherein the first positioner is configured to tilt the infrared light source and translate the infrared light source.

12. The head-mounted device defined in claim 10 wherein the second positioner is configured to tilt the lens and translate the lens.

13. The head-mounted device defined in claim 10 wherein the infrared light source comprises a plurality of independently activated infrared light-emitting diodes.

14. The head-mounted device defined in claim 13 wherein the first positioner is configured to move the infrared light source towards and away from the lens.

15. A head-mounted device, comprising:
a head-mounted housing;
displays in the head-mounted housing; and
a hand tracker in the head-mounted housing, wherein the hand tracker comprises:
    an adjustable infrared illuminator configured to provide infrared light, wherein the adjustable infrared illuminator comprises multiple infrared light-emitting diodes that produce the infrared light and a lens through which the infrared light passes; and
    an infrared image sensor configured to gather infrared hand tracking images illuminated by the infrared light.

16. The head-mounted device defined in claim 15 wherein the adjustable infrared illuminator comprises a positioner configured to move the infrared light-emitting diodes.

17. The head-mounted device defined in claim 16 wherein the adjustable infrared illuminator comprises a positioner configured to move the lens.

18. An electronic device, comprising:

a housing;

a display in the housing and configured to present images to an eye box;

an infrared camera in the housing; and a steerable infrared light illuminator in the housing that faces away from the eye box and is configured to steer infrared light to illuminate a target, wherein the infrared camera is configured to capture an image of the illuminated target.

19. The electronic device defined in claim 18 wherein the infrared camera is configured to monitor movement of the target and wherein the steerable infrared light illuminator is configured to steer the infrared light based on the monitored movement to illuminate the target as the target is moved.

20. The electronic device defined in claim 19 wherein the steerable infrared light illuminator comprises a lens and multiple independently activated infrared light-emitting diodes configured to emit the infrared light through the lens.

* * * * *